(12) United States Patent
Zeng et al.

(10) Patent No.: US 12,142,036 B2
(45) Date of Patent: Nov. 12, 2024

(54) METHOD AND APPARATUS FOR TRAINING VISUAL LANGUAGE PRE-TRAINING MODEL, AND DEVICE AND MEDIUM

(71) Applicant: Beijing Youzhuju Network Technology Co., Ltd., Beijing (CN)

(72) Inventors: Yan Zeng, Beijing (CN); Xinsong Zhang, Beijing (CN); Hang Li, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/531,426

(22) Filed: Dec. 6, 2023

(65) Prior Publication Data
US 2024/0119725 A1  Apr. 11, 2024

Related U.S. Application Data

(63) Continuation of application No. PCT/CN2022/124610, filed on Oct. 11, 2022.

(30) Foreign Application Priority Data

Nov. 9, 2021  (CN) .......................... 202111321649.X (51) Int. Cl.
*G06V 10/96* (2022.01)
*G06F 40/40* (2020.01)
(Continued)

(52) U.S. Cl.
CPC .............. *G06V 10/96* (2022.01); *G06F 40/40* (2020.01); *G06V 10/759* (2022.01); *G06V 10/774* (2022.01); *G06V 10/82* (2022.01)

(58) Field of Classification Search
CPC .... G06V 10/96; G06V 10/759; G06V 10/774; G06V 10/82; G06F 40/40
See application file for complete search history.

(56) References Cited

U.S. PATENT DOCUMENTS

2020/0019807 A1* 1/2020 Ma ........................ G06V 10/454
2020/0082271 A1* 3/2020 Chen ...................... G06N 3/044
(Continued)

FOREIGN PATENT DOCUMENTS

CN  106682059 A  5/2017
CN  106682060 A  5/2017
(Continued)

OTHER PUBLICATIONS

Xiujun Li et al. "Oscar: Object-Semantics Aligned Pre-Training for Vision-Language Task" p. 121-137 (Year: 2020).*
(Continued)

*Primary Examiner* — Ming Y Hon
(74) *Attorney, Agent, or Firm* — Astute IP Law Group (57) ABSTRACT

Provided in the present application are a method and apparatus for training a visual language pre-training model, and a device and a medium. The method includes: acquiring pairing groups respectively corresponding to N images, wherein the pairing group of a first image includes: a first pairing group which is composed of the first image and description text of the first image, and a second pairing group which is composed of a local image of the first image and description text of the local image, N is an integer greater than 1, and the first image is any one of the N images; and training a visual language pre-training model according to the pairing groups respectively corresponding to the N images.

14 Claims, 7 Drawing Sheets

(51) Int. Cl.
*G06V 10/75* (2022.01)
*G06V 10/774* (2022.01)
*G06V 10/82* (2022.01)

(56) References Cited

U.S. PATENT DOCUMENTS

| | | | |
|---|---|---|---|
| 2020/0380403 A1 | 12/2020 | Aggarwal et al. | |
| 2021/0319266 A1 | 10/2021 | Chen et al. | |
| 2022/0147838 A1* | 5/2022 | Gu | G06V 20/00 |
| 2022/0156300 A1* | 5/2022 | Paruchuri | G06N 3/08 |
| 2023/0162481 A1* | 5/2023 | Yuan | G06T 9/00 |
| | | | 382/159 |
| 2023/0162490 A1* | 5/2023 | Zhang | G06V 10/82 |
| | | | 382/159 |

FOREIGN PATENT DOCUMENTS

| | | |
|---|---|---|
| CN | 106778926 A | 5/2017 |
| CN | 110188779 A | 8/2019 |
| CN | 110288665 A | 9/2019 |
| CN | 110458247 A | 11/2019 |
| CN | 111160275 A | 5/2020 |
| CN | 111461203 A | 7/2020 |
| CN | 112116095 A | 12/2020 |
| CN | 112163465 A | 1/2021 |
| CN | 112860888 A | 5/2021 |
| CN | 113095415 A | 7/2021 |
| CN | 113283551 A | 8/2021 |
| CN | 114022735 A | 2/2022 |

OTHER PUBLICATIONS

Jiangtong Li et al., "Memorize, Associate and Match: Embedding Enhancement via Fine-Grained Alignment for Image-Text Retrieval", IEEE Transactions on Image Processing published Nov. 5, 2021 (Year: 2021).*

Wen-Hui Li et al., "Multi-level similarity learning for image-text retrieval" available Nov. 23, 2020 (Year: 2020).*

Dosovitskiy et al., "An image is worth 16x16 words: Transformers for image recognition at scale", In International Conference on Learning Representations, Jun. 3, 2021, 22 pages.

Li et al., "VisualBERT: A Simple and Performant Baseline for Vision and Language," Work in Progress, Aug. 9, 2019, 14 pages.

Lu et al., "ViLBERT: Pretraining Task-Agnostic Visiolinguistic Representations for Vision-and-Language Tasks", Advances in Neural Information Processing Systems, vol. 32, No. 1323, Aug. 6, 2019, 11 pages.

Su et al., "VL-BERT: Pre-training of Generic Visual-Linguistic Representations", International Conference on Learning Representations, Feb. 18, 2020, 16 pages.

Tan et al., "LXMERT: Learning Cross-Modality Encoder Represenations from Transformers", Proceedings of the 2019 Conference on Empirical Methods in Natural Language Processing and the 9th International Joint Conference on Natural Language Processing (EMNLP-IJCNLP), Dec. 3, 2019, 14 pages.

Chen et al., "UNITER: UNiversal Image-TExt Representation Learning", European Conference on Computer Vision, Springer, Jul. 20, 2020, 26 pages.

Li et al., "Oscar: Object-Semantics Aligned Pre-training for Vision-Language Tasks", European Conference on Computer Vision, Jul. 26, 2020, 21 pages.

Gan et al., "Large-Scale Adversarial Training for Vision-and-Language Representation Learning", 34th Conference on Neural Information Processing Systems NeurIPS 2020, Oct. 22, 2020, 16 pages.

Huang et al., "Pixel-BERT: Aligning Image Pixels with Text by Deep Multi-Modal Transformers", Pixel-BERT, Jun. 22, 2020, 17 pages.

Li et al., "Unicoder-VL: A Universal Encoder for Vision and Language by Cross-modal Pre-training", Proceedings of the AAAI Conference on Artificial Intelligence, vol. 34, Dec. 2, 2019, 8 pages.

Huang et al., "Seeing out of the box: End-to-end pre-training for vision-language representation learning", Proceedings of the IEEE/CVF Conference on Computer Vision and Pattern Recognition, Apr. 8, 2021, 13 pages.

Kim et al., "ViLT: Vision-and-Language Transformer Without Convolution or Region Supervision", Proceedings of the 38th International Conference on Machine Learning, PMLR 139, 2021, 12 pages.

Li et al., "Align before Fuse: Vision and Language Representation Learning with Momentum Distillation", 35th Conference on Neural Information Processing Systems NeurIPS 2021, Oct. 7, 2021, 16 pages.

Xu et al., "E2E-VLP: End-to-End Vision-Language Pre-training Enhanced by Visual Learning", Alibaba Group, Jun. 4, 2021, 11 pages.

Zhang et al., "VinVL: Revisiting Visual Representations in Vision-Language Models", Proceedings of the IEEE/CVF Conference on Computer Vision and Pattern Recognition, Mar. 10, 2021, 30 pages.

* cited by examiner

METHOD AND APPARATUS FOR TRAINING VISUAL LANGUAGE PRE-TRAINING MODEL, AND DEVICE AND MEDIUM

CROSS REFERENCES TO RELATED APPLICATIONS

The application is a continuation of International Patent Application No. PCT/CN2022/124610, filed on Oct. 11, 2022, which claims the priority of China patent application No. "202111321649. X", which was filed on Nov. 9, 2021 with the application name of "METHOD AND APPARATUS FOR TRAINING VISUAL LANGUAGE PRE-TRAINING MODEL, AND DEVICE AND MEDIUM", and the entire contents of the China patent application are incorporated into the application by reference.

TECHNICAL FIELD

The embodiment of the invention relates to the technical field of computers, and in particular, relates to a training method, an apparatus, a device and a medium of a visual language pre-training model.

BACKGROUND

Usually, a training apparatus can train a visual language pre-training model through a matching group composed of a large number of images and text descriptions of the images, and further, the training apparatus can fine-tune the visual language pre-training model, so that the fine-tuned visual language pre-training model can be applied to downstream services such as a graphic retrieval task, a visual question-answer task, a visual reasoning task, a visual basic training, etc. Therefore, a training process of the visual language pre-training model is very important, and it directly affects the implementation effect of the downstream tasks.

There are some related technologies, such as Pixel-Bidirectional Encoder Representations from Transformer (Pixel-BERT), Seeing Out of the bOx (SOHO), a Vision-and-Language Transformer without convolution or region supervision (ViLT), ALign BEfore Fuse (ALBEF), and other visual language pre-training models. The training apparatus trains these models through the matching group composed of images and text descriptions of images. However, this makes the model only learn this coarse-grained matching group, which leads to the trained model being unable to better adapt to the downstream tasks.

SUMMARY

The application provides a training method, apparatus, device, and medium for a visual language pre-training model, so that the trained visual language pre-training model can better adapt to the downstream tasks.

In a first aspect, the application provides A training method of a visual language pre-training model, comprising:
acquiring matching groups respectively corresponding to N images, wherein the matching group of a first image includes: a first matching group composed of the first image and a description text of the first image, and a second matching group composed of a local image of the first image and a description text of the local image, wherein N is an integer greater than 1, and the first image is any one of the N images; and training the visual language pre-training model according to the respectively corresponding matching groups of the N images.

In a second aspect, the application provides A training apparatus for a visual language pre-training model, comprising:
an acquisition module, configured to acquire matching groups respectively corresponding to N images, wherein the matching group of a first image includes a first matching group composed of the first image and a description text of the first image, and a second matching group composed of a local image of the first image and a description text of the local image, wherein N is an integer greater than 1, and the first image is any one of the N images; and a training module, configured to train the visual language pre-training model according to the matching groups respectively corresponding to the N images.

In a third aspect, an electronic device is provided, which comprises a processor and a memory, wherein the memory is used for storing a computer program, and the processor is used for calling and running the computer program stored in the memory to execute the method as in the first aspect or its respective implementations.

In a fourth aspect, there is provided a computer-readable storage medium for storing a computer program that causes a computer to perform the method as in the first aspect or its respective implementations.

In a fifth aspect, there is provided a computer program product comprising computer program instructions that cause a computer to perform the method as in the first aspect or its respective implementations.

In a sixth aspect, there is provided a computer program which causes a computer to perform the method as in the first aspect or its respective implementations.

Through the technical scheme of the application, the electronic device can train the visual language pre-training model through the coarse-grained matching group composed of the image and its corresponding description text, and fine-grained matching group composed of the local image of the image and the description text corresponding to the local image, so that the model can learn one-to-one correspondence between more detailed features of the image and the description text, thus being better adapted to the downstream tasks.

BRIEF DESCRIPTION OF THE DRAWINGS

In order to explain a technical scheme in the embodiment of the present invention more clearly, the drawings needed in the description of the embodiment will be briefly introduced below. Obviously, the drawings in the following description are only some embodiments of the present invention. For ordinary people in the field, other drawings can be obtained according to these drawings without creative work.

DETAILED DESCRIPTION

In the following, a technical scheme in the embodiment of the invention will be clearly and completely described with reference to the attached drawings. Obviously, the described embodiment is only a part of the embodiment of the invention, but not the whole embodiment. Based on the embodiments in the present invention, all other embodiments obtained by ordinary technicians in the field without creative work belong to the scope of protection of the present invention.

It should be noted that the terms "first" and "second" in the description and claims of the present invention and the above drawings are used to distinguish similar objects, and are not necessarily used to describe a specific order or a sequence. It should be understood that the data thus used are interchangeable under appropriate circumstances, so that the embodiments of the invention described herein can be implemented in other orders than those illustrated orders or described orders herein. Furthermore, the terms "including" and "comprising" and any variations thereof are intended to cover non-exclusive inclusion, for example, a process, a method, a system, a product or a server that includes a series of steps or a series of units is not necessarily limited to those explicitly listed, but may include other steps or other units not explicitly listed or inherent to these processes, methods, products or devices.

Before introducing the technical scheme of the application, the related knowledge of the technical scheme of the application is described below:

Visual Language Pre-Training Model

A training process of the visual language pre-training model may include: a Pre-Training stage and a Fine-Tuning stage. Herein, in the pre-training stage, a large number of image-description texts can be used to train the visual language pre-training model. In the fine-tuning stage, a small amount of data can be used to fine-tune the language pre-training model.

It should be understood that the visual language pre-training model is also called a visual language model or a Pre-Trained Vision Language Model.

As mentioned above, there are some visual language pre-training models such as Pixel-BERT, SOHO, ViLT, ALBEF, etc. All the training apparatuses train these models through the matching groups composed of images and text descriptions of images. However, this makes the model only learn this coarse-grained matching group, which leads to the trained model not being better adapted to the downstream tasks.

In order to solve the above technical problems, the application trains the visual language pre-training model through coarse-grained matching groups composed of the images and their corresponding description texts, and fine-grained matching groups composed of local images and description texts corresponding to the local images, so that the model can learn one-to-one correspondence between more detailed features of the image and the description text, thus being better adapted to the downstream tasks.

Figure 1:
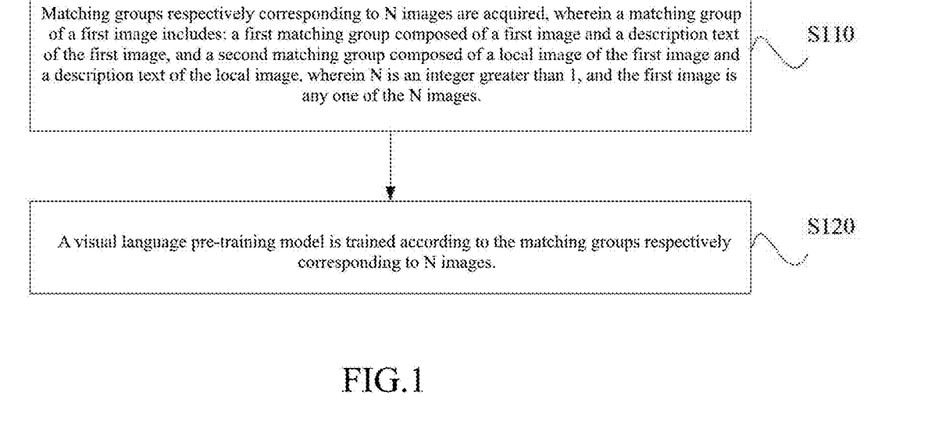
FIG. 1 is a training method of a visual language pre-training model provided by an embodiment of the present application.

The technical scheme of the application will be described in detail below:

FIG. 1 is a training method of a visual language pre-training model provided by the embodiment of the present application. The method can be executed by electronic devices such as desktop computers, notebook computers, tablets, etc., and the present application does not limit this. As shown in FIG. 1, the method includes the following steps.

S110: The matching groups respectively corresponding to N images are acquired, herein the matching group of the first image includes: a first matching group composed of a first image and a description text of the first image, and a second matching group composed of a local image of the first image and a description text of the local image, herein N is an integer greater than 1, and the first image is any one of the N images.

S120: The visual language pre-training model is trained according to the matching groups respectively corresponding to the N images.

It should be understood that the matching groups respectively corresponding to the N images constitute a training set of the visual language pre-training model, which is used for training the visual language pre-training model.

In some embodiments, the local image of the first image is a local region image and/or an object image of the first image, and accordingly, the description text of the local image includes: a description text of the local region image and/or the object image.

It should be understood that the local region image may include one or more object images. That is, granularity of the first image, the local region image and the object image is in the following order: the granularity of the first image is greater than the granularity of the local region image, and the granularity of the local region image is greater than the granularity of the object image.

Figure 2:
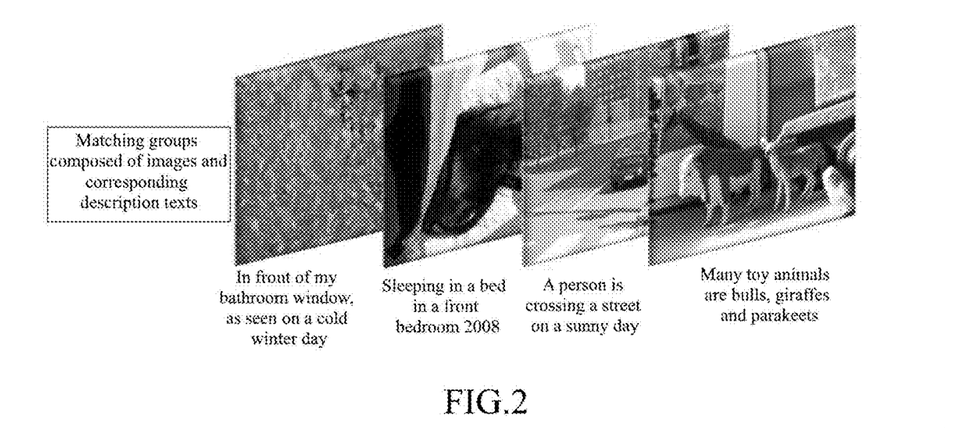
FIG. 2 is a schematic diagram of matching groups composed of images and corresponding description texts provided by an embodiment of the present application.
Figure 3:
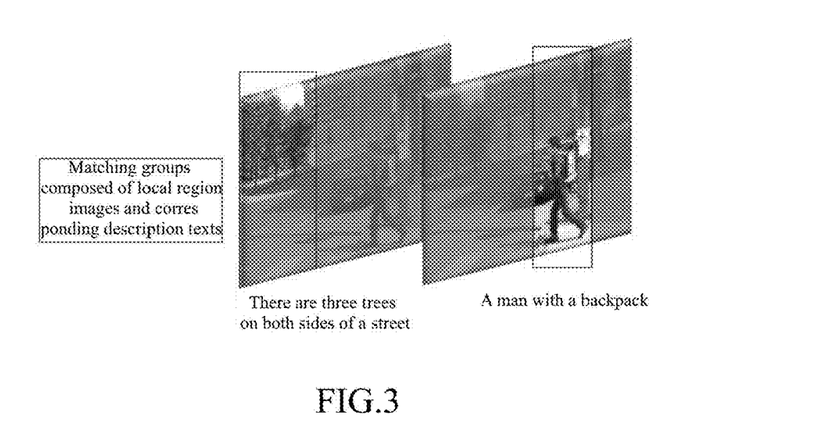
FIG. 3 is a schematic diagram of matching groups composed of local region images and corresponding description texts provided by the embodiment of the application.
Figure 4:
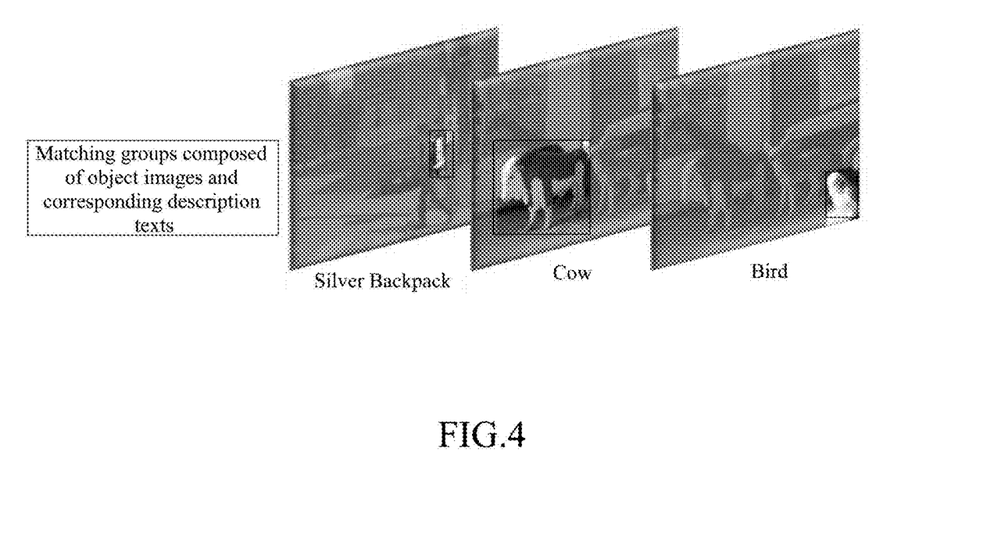
FIG. 4 is a schematic diagram of matching groups composed of object images and corresponding description texts provided by an embodiment of the present application.

Exemplarily, FIG. 2 exemplarily shows four images, and the description text under each image is the description text corresponding to the image; FIG. 3 exemplarily shows two images, wherein the two regions enclosed by a rectangular frame are local region images, and the description text under each local region image is the description text corresponding to the local region image; and FIG. 4 exemplarily shows three images, wherein the two regions enclosed by the rectangular frame are both object images, and the description text under each object image is the description text corresponding to the object image.

In order to better train the visual language pre-training model, the electronic device can perform multi-task training on the group-based visual language pre-training model.

In some embodiments, multitasking includes, but is not limited to, detection vision tasks and modeling correlation tasks. Herein the detection vision task is to detect the local image according to the description text of the local image; the modeling correlation task is to establish correlation between the first image and any description text in the matching groups respectively corresponding to the N images, and correlation between the local image and any description text in the matching groups respectively corresponding to the N images.

It should be understood that from the definition of the detection vision tasks, the visual language pre-training model is trained by the electronic device through the detection vision tasks, so that the model can learn an internal situation of the matching groups, i.e., the corresponding relationship between the local image and the description text corresponding to the local image. According to the definition of the modeling correlation task, the electronic device trains the visual language pre-training model through the modeling correlation tasks, so that the model can learn the situation between the matching groups, i.e., the corresponding relationship between any image and any description text, which can be the whole image or the local image in the whole image.

It should be understood that the establishment of loss function is very important in the process of model training, and the loss function corresponding to the detection vision task and the modeling correlation task may be as follows, but not limited to this.

The loss function of the detection vision task includes at least one of the following: a L1 loss function and an Intersection over Union (IoU) loss function, or the loss function of the detection vision task includes at least one of the following: a L2 loss function and the IoU loss function. In short, the application does not limit the loss function of the detection vision task.

It should be noted that if the loss function of the detection vision task includes multiple items, the electronic device can sum these multiple items or find a weighted average when calculating the loss of the detection vision task.

The L1 loss function, i.e., a L1 norm loss function, is also called minimum absolute deviation or minimum absolute error. Generally speaking, it is to minimize the sum of absolute differences between a target value and an estimated value. For details, please refer to Formula (4):

$$S = \sum_{i=1}^{n} |Y_i - f(x_i)| \quad (4)$$

wherein S represents the sum of absolute differences between the target value and the estimated value; $x_i$ represents the description text of any local image; $f(x_i)$ represents the predicted value corresponding to $x_i$ predicted by the visual language pre-training model, and the predicted value is a local image; $Y_i$ is the target value corresponding to $x_i$, i.e., the actual corresponding local image; and n represents the number of description texts corresponding to all local images in the training set.

The L2 loss function, i.e., a L2 norm loss function, is also called a minimum square error. Generally speaking, it is to minimize the sum of squares of the differences between the target value and the estimated value. For details, please refer to Formula (5):

$$S = \sum_{i=1}^{n} (Y_i - f(x_i))^2 \quad (5)$$

Herein S represents the sum of squares of the differences between the target value and the estimated value; $x_i$ represents the description text of any local image; $f(x_i)$ represents the predicted value corresponding to $x_i$ predicted by the visual language pre-training model, and the predicted value is a local image; $Y_i$ is the target value corresponding to $x_i$, i.e., the actual corresponding local image; and n represents the number of description texts corresponding to all local images in the training set.

IoU is to calculate the intersection ratio between the predicted local image and the real local image corresponding to the same description text. For details, please refer to Formula (6):

$$IoU = \frac{|A \cap B|}{|A \cup B|} \quad (6)$$

Further, the electronic device can sum and average the IOUs corresponding to the description texts corresponding to all local images in the training set to obtain the final IoU loss.

In some embodiments, the loss function corresponding to a modeling correlation task includes at least one of the following, but is not limited to this: contrast loss, cross entropy loss, and Masked Language Modeling (MLM) loss. In short, the application does not limit the loss function corresponding to the modeling correlation task.

It should be noted that if the loss function corresponding to the modeling correlation task includes multiple items, the electronic device can sum these multiple items or find the weighted average when calculating the loss of the modeling correlation task.

It should be understood that calculations of the contrast loss, cross entropy loss and MLM loss are all based on the image representation of the image and the text representation of the description text, wherein the image may be a whole image, which is also called a global representation of the image, or the image may be a local image, which is also called a local representation of the whole image where the local image is located.

It should be understood that in the application, the image representation refers to a representation vector of an encoded image, and the text representation refers to a representation vector of an encoded text.

In some embodiments, the electronic device can use the following formula (7) to calculate the contrast loss between the image representation corresponding to each image in the training set and the text representation actually corresponding to the image representation, and finally sum these contrast losses, or find the weighted average to get the final contrast loss:

$$S = \frac{dist(A_i, B_i)}{\sum_{j=1}^{m} dist(A_i, B_j)} \quad (7)$$

Herein $A_i$ represents the image representation corresponding to an i-th image in the training set, $B_i$ represents the text representation corresponding to the description text of the i-th image forming the matching group, $B_j$ represents the text representation corresponding to the description text of a j-th image forming the matching group in the training set, m represents the number of description texts included in the training set, and S represents the contrast loss of the image representation corresponding to the i-th image and the text representation actually corresponding to the image representation.

In some embodiments, the electronic device can calculate the cross entropy loss by using Formula (8):

$$\text{loss} = -\frac{1}{m}\sum_{i=1}^{m}\sum_{j=1}^{n} p(x_{ij})\log(q(x_{ij})) \qquad (8)$$

Herein m may be twice the number of all images in the training set, and the images include: the whole image and the local images, and n represents the number of matching types. In the application, n=2, because the matching types include: matching success types and matching failure types, $p(x_{ij})$ represents a real probability that the i-th matching group is the j-th matching type, and $q(x_{ij})$ represents the predicted probability that the i-th matching group is the j-th matching type.

It should be understood that the value of m is twice the number of all images in the training set, because when calculating the cross-entropy loss, for any image, it is only necessary to select its corresponding real description text and predict its cross-entropy loss, and select another non-real description text to predict its cross-entropy loss.

Exemplarily, suppose that the real description text corresponding to the i-th image is the i-th description text, and the probability that the predicted description text corresponding to the i-th image is the i-th description text is 0.7, and the probability that the predicted description text corresponding to the i-th image is not the i-th description text is 0.3, i.e., the probability of the predicted success of matching between the i-th image and the i-th description text successes is 0.7. The probability of the predicted failure of matching between the i-th image and the i-th description text is 0.3, then the electronic device can calculate the cross entropy loss corresponding to the i-th image and the i-th description text as −(0*log(0.3)+1*log(0.7)).

It should be understood that the MLM loss is for the description text in the training set, and the calculation process can refer to a relevant MLM loss calculation method, which is not repeated in the application.

In some embodiments, the electronic device can sum or average the losses after the losses corresponding to the visual detection task and the modeling correlation task are obtained, and stop the model training when the finally obtained losses reach the minimum or convergence, or stop the model training when the number of iterations reaches a preset threshold. In short, the application does not limit training stop conditions of the model.

Figure 5:
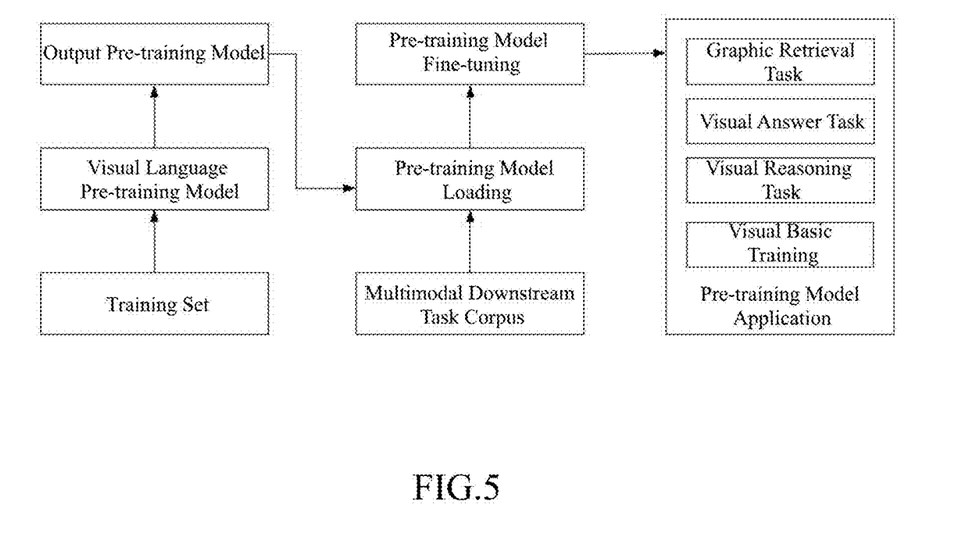
FIG. 5 is a flowchart of a training process and an application process of a visual language pre-training model provided by the embodiment of the present application.

Further, after the electronic device trains the visual language pre-training model, it can also fine-tune the visual language pre-training model to adapt to different downstream tasks. For example, as shown in FIG. 5, the visual language pre-training model can be trained through the training set composed of a plurality of first matching groups and a plurality of second matching groups, and a trained visual language pre-training model can be output. In order to distinguish the visual language pre-training model before training and after training, the visual language pre-training model before training will be shown in FIG. 5. Furthermore, the pre-training model can be fine-tuned by multimodal downstream task corpus, which should be understood as including visual and linguistic task corpus. Furthermore, the pre-training model after fine-tuning can be applied to downstream business such as graphic retrieval task, visual question-answer task, visual reasoning task, visual basic training, etc.

In some embodiments, fine-tuning the visual language pre-training model includes fine-tuning the trained visual language pre-training model through the multimodal downstream task corpus; herein, the multimodal task corpus includes visual and linguistic task corpus.

To sum up, in the application, the electronic device can train the visual language pre-training model through the coarse-grained matching group composed of the image and its corresponding description text, and the fine-grained matching group composed of the local image of the image and the description text corresponding to the local image, so that the model can learn one-to-one correspondence between more detailed features of the image and the description text, thus being better adapted to the downstream tasks.

Further, the electronic device can perform multi-task training on the visual language pre-training model, such as training the visual language pre-training model by detection vision tasks and modeling correlation tasks. As mentioned above, the electronic device can train the visual language pre-training model by detection vision tasks, so that the model can learn the internal situation of the matching group, and train the visual language pre-training model by modeling correlation tasks, so that the model can learn the situation between matching groups, and the model can further learn one-to-one correspondence between more detailed features of the image and the description text, thus being better adapted to the downstream tasks.

Figure 6:
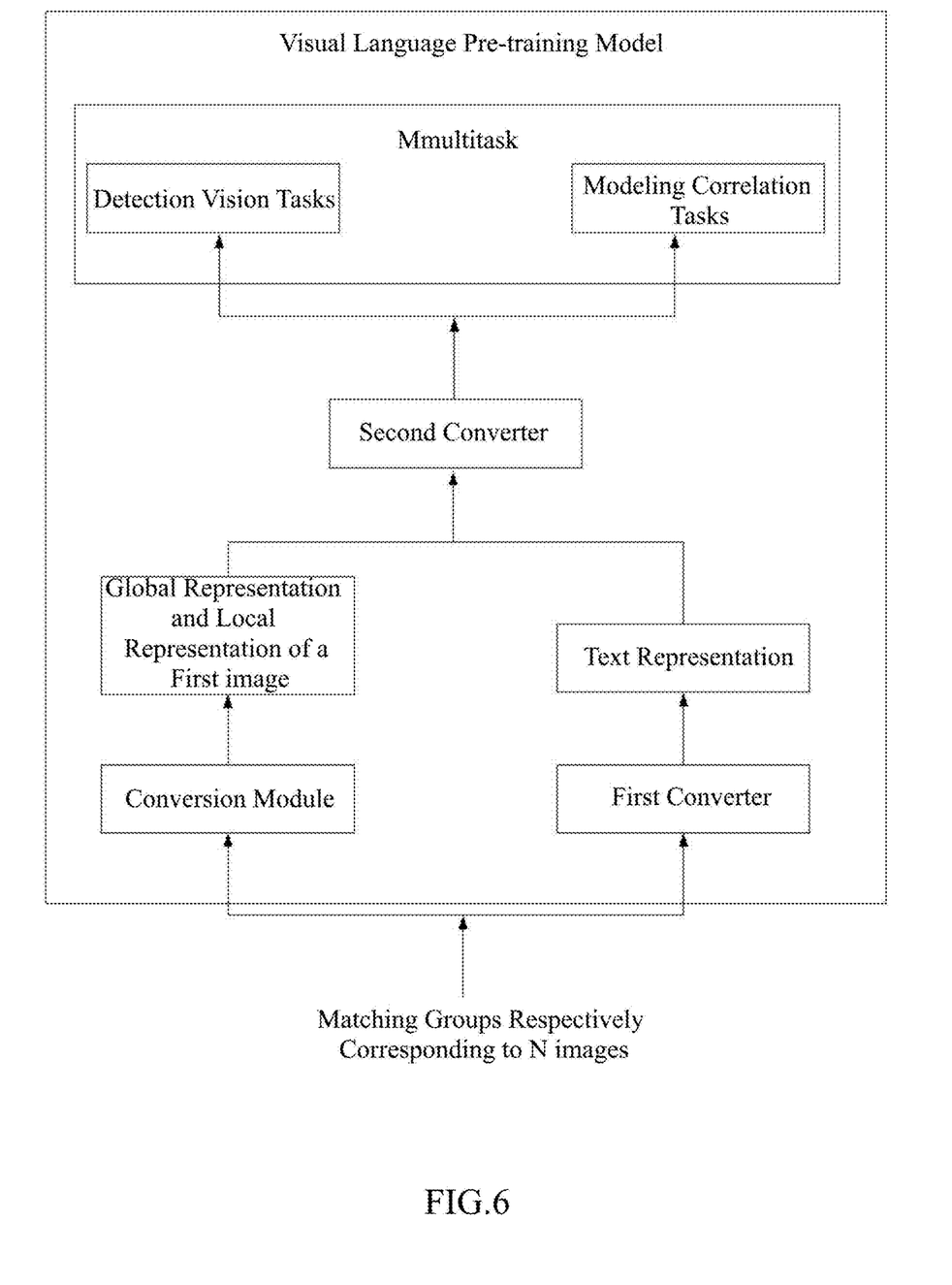
FIG. 6 is a schematic diagram of a visual language pre-training model provided by the embodiment of the present application.

The following is an introduction to a visual language pre-training model provided by the application:

FIG. 6 is a schematic diagram of a visual language pre-training model provided by an embodiment of the application. As shown in FIG. 6, the visual language pre-training model includes a conversion module, a first converter and a second converter, wherein the input of the model is a matching group respectively corresponding to the N images, and the conversion module is used for encoding a first image to obtain a global representation of the first image, and encoding a local image according to the global representation and the local image of the first image to obtain a local representation of the first image; the first converter is used for encoding the description text of the first image to obtain a text representation of the first image and encoding the description text of the local image to obtain the text representation of the local image; and the second converter is used for encoding the global representation of the first image, the local representation of the first image, the text representation of the first image and the text representation of the local image to obtain a multimodal representation of the first image.

Figure 7:
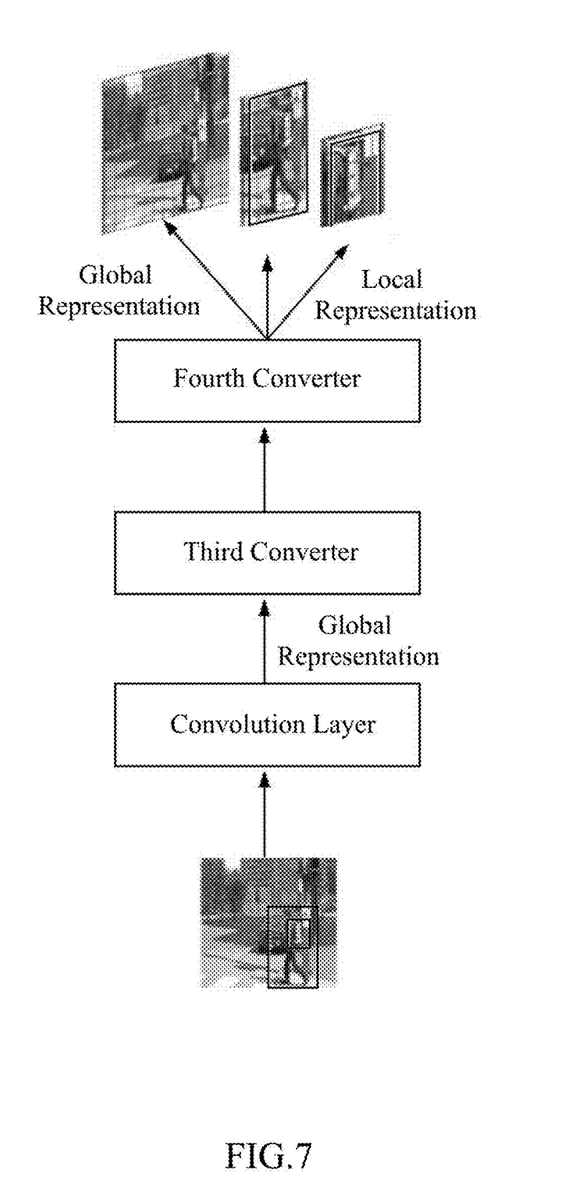
FIG. 7 is a schematic diagram of a conversion module provided by the embodiment of the present application.

FIG. 7 is a schematic diagram of the conversion module provided by an embodiment of the application. As shown in FIG. 7, the conversion module includes a convolution layer, a third converter and a fourth converter, wherein the convolution layer is used for a convolution processing on the first image to obtain the convolution processing result of the first image; the third converter is used for encoding the convolution processing result of the first image to obtain the global representation of the first image; and the fourth converter is used for processing the global representation and the local image of the first image to obtain the local representation of the first image.

In some embodiments, the convolution layer is a Conv2d Layer, but it is not limited thereto.

In some embodiments, the third converter is an N-layer Transformer, N=6 or 12, etc., which is not limited by the application.

In some embodiments, the fourth converter is an N-layer Transformer, N=6 or 12, etc., which is not limited by the application.

In some embodiments, the first converter is an N-layer Transformer, N=6 or 12, etc., which is not limited by the application.

In some embodiments, the second converter is an N-layer Transformer, N=6 or 12, etc., which is not limited by the application. It should be understood that the second converter is also called a multimodal converter because it can process the image representations (including the global representations and the local representations of images) as well as the text representations.

Figure 8:
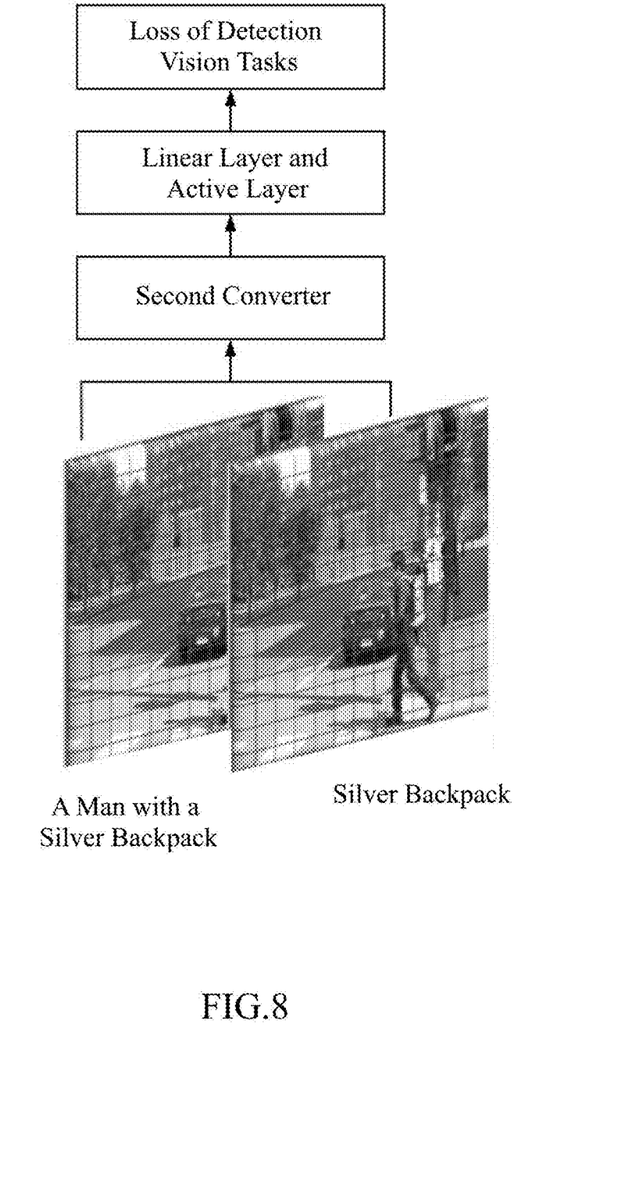
FIG. 8 is a schematic diagram of model training based on detection vision tasks provided by the embodiment of the present application.

FIG. 8 is a schematic diagram of the model training based on detection vision tasks provided by the embodiment of the present application. As shown in FIG. 8, after the second converter obtains the multimodal representation of the first image, the electronic device can process the multimodal representation through a Linear Layer and a Sigmoid, and based on this, the loss of detection vision tasks can be obtained.

Figure 9:
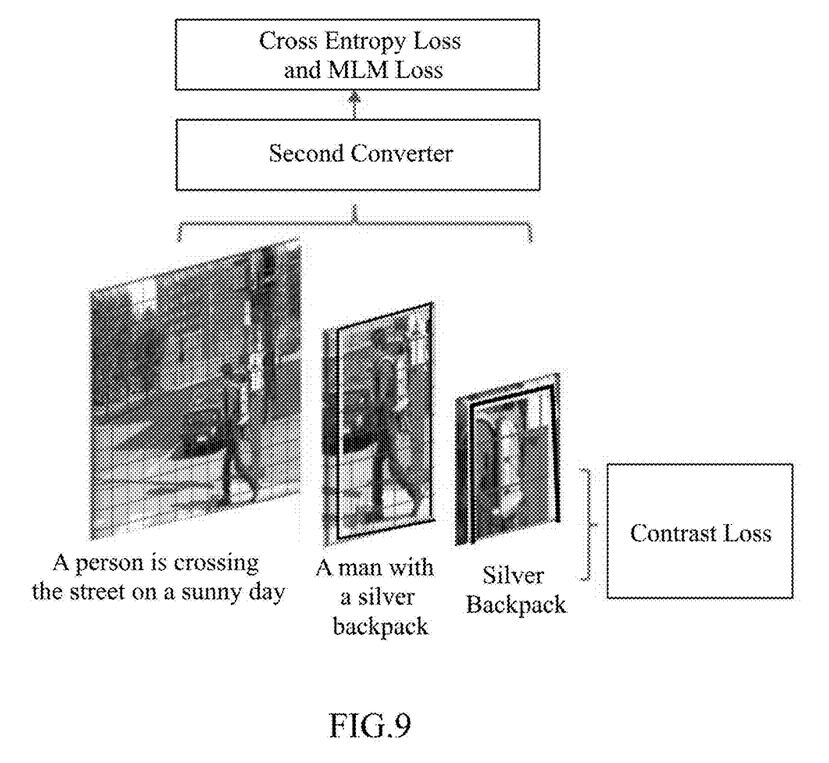
FIG. 9 is a schematic diagram of model training based on modeling correlation tasks provided by the embodiment of the present application.

FIG. 9 is a schematic diagram of the model training based on modeling correlation tasks provided by the embodiment of the application. As shown in FIG. 9, it is assumed that the downstream business of graphic retrieval task, visual question and answer task, visual reasoning task and visual basic training to compare the advantages and disadvantages between the technical scheme of the application and related technical schemes.

A graphic retrieval task, which is mainly used to retrieve the corresponding description text through the image, or to retrieve the corresponding image through the description text. A typical graphic retrieval task include Retrieval COCO and Retrieval Flickr. Table 1 is mainly evaluated on a 1K test set of Retrieval Flickr30K and a 5K test set of Retrieval COCO.

A visual question-answer task, which is mainly used to answer questions according to images and corresponding description questions. A typical visual question-answer task may be VQA.

A visual reasoning task, which is mainly used to judge whether the description text can describe the image correctly. The typical visual reasoning task may be NLVR^2.

A visual basic training, which is mainly used to circle the task of the region corresponding to the description text in the image. The typical visual basic training may be RefCOCO. The application mainly investigates the model ability under two settings, one is a weak supervision scene, i.e., the model training is carried out without providing the labeling information related to a bounding box; and the other is to use a supervision signal of the bounding box (bbox).

TABLE 1

| Model name | Training corpus | Retrieval-coco 5K test set Text retrieval/image retrieval | | Retrieval-flickr 1K test set Text retrieval/image retrieval | | RefCOCO+ (weak supervision) (Verification Set/Test Set A/Test Set B) | RefCOCO+ (including bounding box superviseon) (Verification Set/Test Set A/ Test Set B) | NLVR^2 (Verification Set/Test Set) | VQA (Test-Verification Set/Test-Standard Set) |
|---|---|---|---|---|---|---|---|---|---|
| UNIT-ER | 44M | 64.40/ 87.40/ 93.08 | 50.33/ 78.52/ 87.16 | 50.33/ 78.52/ 87.16 | 85.90/ 97.10/ 98.80 | / | 75.31/ 81.30/ 65.58 | 77.18/ 77.85 | 72.70/ 72.91 |
| Oscar | 44M | 70.0/ 91.1/ 95.5 | 54.0/ 80.8/ 88.5 | / | / | / | / | 78.07/ 78.36 | 73.16/ 73.44 |
| VinVL, | 44M | 74.6/ 92.6/ 96.3 | 58.1/ 83.2/ 90.1 | / | / | / | / | 82.05/ 83.08 | 75.95/ 76.12 |
| ALB-EF | 44M | 73.1/ 91.4/ 96.0 | 56.8/ 81.5/ 89.2 | 94.3/ 99.4/ 99.8 | 82.8/ 96.7/ 98.4 | 57.85/ 65.89/ 46.43 (Recurrence) | / | 80.24/ 80.50 | 74.54/ 74.70 |
| ALB-EF | 114M | 77.6/ 94.3/ 97.2 | 60.7/ 84.3/ 90.5 | 95.9/ 99.8/ 100.0 | 85.6/ 97.5/ 98.9 | 58.46/ 65.89/ 46.25 | / | 82.55/ 83.14 | 75.84/ 76.04 |
| the application | 44M | 78.8/ 94.3/ 97.5 | 60.6/ 84.2/ 90.5 | 96.0/ 99.7/ 99.9 | 84.1/ 96.9/ 98.4 | 75.81/ 82.13/ 68.26 | 64.79/ 72.14/ 54.94 | 82.4/ 82.42 | 76.20/ 76.23 |
| The application | 114M | 79.7/ 95.3/ 97.6 | 62.5/ 85.3/ 91.0 | 96.8/ 99.8/ 99.8 | 86.0/ 97.2/ 98.7 | 76.18/ 82.76/ 66.50 | 65.98/ 73.61/ 55.82 | 83.4/ 84.84 | 76.77/ 76.89 | loss function corresponding to the modeling correlation task includes: contrast loss, cross entropy loss and MLM loss, wherein the contrast loss is calculated according to the text representation output by the first converter and the global representation and the local representation of the first image output by the conversion module, and the cross entropy loss and the MLM loss can be calculated in the whole 12 layers.

Next, the visual language pre-training model obtained in the application and the visual language pre-training model obtained through related technical training are applied to the Herein, the training corpus is 4M, which means that 4 million pictures and texts are used for model training; and the training corpus is 14M, which means that 14 million pictures and texts are used for model training.

To sum up, according to the evaluation results in Table 1, the model trained by the application is more suitable for the downstream tasks.

Figure 10:
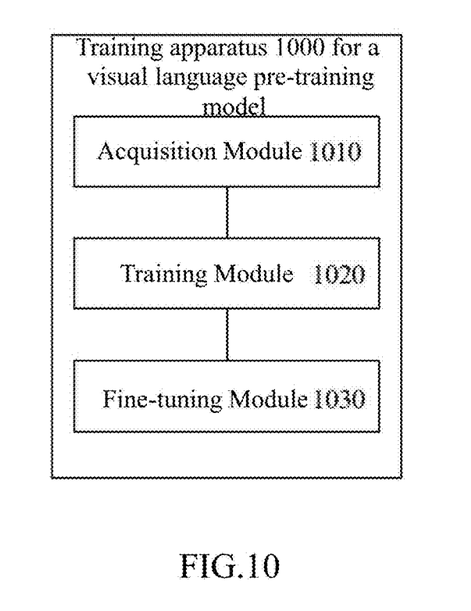
FIG. 10 is a schematic diagram of a training apparatus 1000 for a visual language pre-training model provided by the embodiment of the present application.

FIG. 10 is a schematic diagram of a training apparatus 1000 for the visual language pre-training model provided by the embodiment of the present application. As shown in FIG.

10, the apparatus 1000 includes: an acquisition module 1010 and a training module 1020, wherein the acquisition module 1010 is used for acquiring matching groups respectively corresponding to the N images, wherein the matching group of the first image includes a first matching group composed of a first image and a description text of the first image, and a local image and the local image of the first image. The training module 1020 is used for training the visual language pre-training model according to the matching groups respectively corresponding to the N images.

In some embodiments, the training module 1020 is specifically configured to perform multi-task training on the visual language pre-training model according to the matching groups respectively corresponding to the N images.

In some embodiments, multitasking includes: detection vision tasks and modeling correlation tasks; wherein, the detection vision task is to detect the local image according to the description text of the local image; and the modeling correlation task is to establish the correlation between the first image and any description text in the matching groups respectively corresponding to the N images, and correlation between the local image and any description text in the matching group respectively corresponding to the N images.

In some embodiments, the visual language pre-training model includes:
  a conversion module, which is configured to encode the first image to obtain the global representation of the first image, and encoding the local image according to the global representation and the local image of the first image to obtain the local representation of the first image;
  a first converter, which is configured to encode the description text of the first image to obtain the text representation of the first image and encoding the description text of the local image to obtain the text representation of the local image; and
  a second converter, which is configured to encode the global representation of the first image, the local representation of the first image, the text representation of the first image and the text representation of the local image to obtain the multimodal representation of the first image.

In some embodiments, the conversion module includes:
  a convolution layer, which is configured to perform the convolution processing on the first image to obtain the convolution processing result of the first image;
  a third converter, which is configured to encode the convolution processing result of the first image to obtain the global representation of the first image; and
  a fourth converter, which is configured to process the global representation and the local image of the first image to obtain the local representation of the first image.

In some embodiments, the local image includes: a local region image and/or an object image of the first image; and accordingly, the description text of the local image includes a description text of the local region image and/or the object image.

In some embodiments, the apparatus 1000 further includes: a fine-tuning module 1030, which is configured to fine-tune the visual language pre-training model after the training module 1020 trains the visual language pre-training model according to the matching groups respectively corresponding to the N images.

In some embodiments, the fine-tuning module 1030 is specifically configured to fine-tune the trained visual language pre-training model through the multimodal downstream task corpus; wherein the multimodal task corpus includes the visual and linguistic task corpus.

It should be understood that the apparatus embodiment and the method embodiment can correspond to each other, and similar descriptions can refer to the method embodiment. In order to avoid repetition, it is not repeated here for brevity. Specifically, the apparatus 1000 shown in FIG. 10 can execute the method embodiment corresponding to FIG. 1, and the aforementioned and other operations and/or functions of each module in the device 1000 are respectively to realize the corresponding flows in each method in FIG. 1, and it is not repeated here for brevity.

The device 1000 of the embodiment of the present application has been described above from the perspective of functional modules with the attached drawings. It should be understood that the functional module can be realized by hardware, by instructions in software, and by a combination of hardware and software modules. Specifically, each step of the method embodiment in the embodiment of the present application can be completed by an integrated logic circuit of hardware and/or an instruction in the form of software in the processor, and the steps of the method disclosed in combination with the embodiment of the present application can be directly embodied as the completion of the hardware decoding processor or the completion of the combination of hardware and software modules in the decoding processor. Alternatively, the software module can be located in a mature storage medium such as random access memory, flash memory, read-only memory, programmable read-only memory, electrically erasable programmable memory, registers, etc. The storage medium is located in the memory, and the processor reads the information in the memory and completes the steps in the above method embodiment in combination with its hardware.

Figure 11:
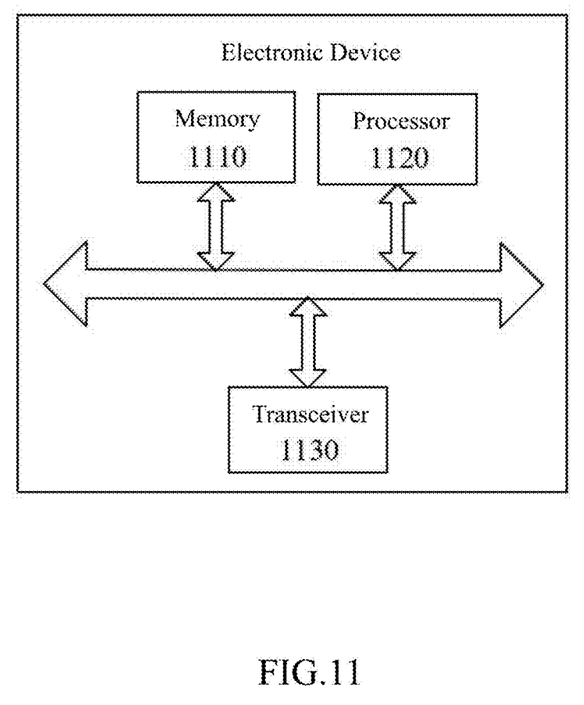
FIG. 11 is a schematic block diagram of an electronic device 1100 provided by the embodiment of the present application.

FIG. 11 is a schematic block diagram of an electronic device 1100 provided by an embodiment of the present application.

As shown in FIG. 11, the electronic device 1100 may include:
  a memory 1111 and a processor 1120, wherein the memory 1111 is configured to store a computer program and transmitting the program code to the processor 1120. In other words, the processor 1120 can call and run a computer program from the memory 1111 to realize the method in the embodiment of the present application.

For example, the processor 1120 can be used to perform the above method embodiments according to instructions in the computer program.

In some embodiments of the present application, the processor 1120 may include, but is not limited to:
  a general processor, a Digital Signal Processor (DSP), an application specific integrated circuit (ASIC), a Field Programmable Gate Array (FPGA) or other programmable logic devices, discrete gates or transistor logic devices, discrete hardware components, and so on.

In some embodiments of the present application, the memory 1111 includes, but is not limited to:
  a volatile memory and/or a nonvolatile memory. Among them, the nonvolatile memory may be Read-Only Memory (ROM), programmable read-only memory (PROM), erasable programmable read-only memory (EPROM), electrically erasable programmable read-only memory (EEPROM) or flash memory. The volatile memory may be a Random Access Memory (RAM), which is used as an external cache. By way of illustration, but not limitation, many forms of RAM are available, such as static random access memory (SRAM), dynamic random access memory (DRAM), synchronous dynamic random access memory (Synchronous DRAM, SDRAM), Double Data Rate SDRAM (DDR SDRAM), enhanced synchronous dynamic random access memory (ESDRAM), synchronous link dynamic random access memory (SLDRAM) and direct memory bus random access memory (DR RAM).

In some embodiments of the present application, the computer program may be divided into one or more modules, which are stored in the memory 1111 and executed by the processor 1120 to complete the method provided by the present application. The one or more modules can be a series of computer program instruction segments that can accomplish specific functions, and the instruction segments are used to describe the execution process of the computer program in the electronic device.

As shown in FIG. 11, the electronic device may further include:
a transceiver 1130, which may be connected to the processor 1120 or the memory 1111.

The processor 1120 may control the transceiver 1130 to communicate with other devices, specifically, it may send or receive information or data from other devices. The transceiver 1130 may include a transmitter and a receiver. The transceiver 1130 may further include antennas, and the number of antennas may be one or more.

It should be understood that all components in the electronic equipment are connected through a bus system, wherein the bus system includes a power bus, a control bus and a status signal bus in addition to a data bus.

The application also provides a computer storage medium, on which a computer program is stored, which, when executed by a computer, enables the computer to perform the method of the above method embodiment. In other words, the embodiment of the application also provides a computer program product containing instructions which, when executed by a computer, cause the computer to execute the method of the above method embodiment.

When implemented in software, it can be fully or partially implemented in the form of a computer program product. The computer program product includes one or more computer instructions. When the computer program instructions are loaded and executed on a computer, the flow or function according to the embodiment of the application is generated in whole or in part. The computer can be a general-purpose computer, a special-purpose computer, a computer network, or other programmable devices. The computer instructions can be stored in a computer-readable storage medium or transmitted from one computer-readable storage medium to another. For example, the computer instructions can be transmitted from one website, computer, server or data center to another website, computer or server by wired (such as coaxial cable, optical fiber, digital subscriber line (DSL)) or wireless (such as infrared, wireless, microwave, etc.). The computer-readable storage medium can be any available medium that a computer can access or a data storage device such as a server or a data center that contains one or more available media integration. The usable medium may be a magnetic medium (e.g., floppy disk, hard disk, magnetic tape), an optical medium (e.g., digital video disc (DVD)), or a semiconductor medium (e.g., solid state disk (SSD)) and the like.

One of ordinary skill in the art can realize that the modules and algorithm steps described in connection with the embodiments disclosed herein may be implemented in electronic hardware, or a combination of computer software and electronic hardware. Whether these functions are implemented in hardware or software depends on the specific application and design constraints of the technical scheme. Skilled people may use different methods to realize the described functions for each specific application, but this implementation should not be considered beyond the scope of this application.

In several embodiments provided by this application, it should be understood that the disclosed systems, devices and methods can be realized in other ways. For example, the device embodiment described above is only schematic. For example, the division of the module is only a logical function division. In actual implementation, there may be other division methods, such as multiple modules or components may be combined or integrated into another system, or some features may be ignored or not implemented. On the other hand, the mutual coupling or direct coupling or communication connection shown or discussed may be indirect coupling or communication connection through some interfaces, devices or modules, which may be electrical, mechanical or other forms.

The modules described as separate components may or may not be physically separated, and the components displayed as modules may or may not be physical modules, that is, they may be located in one place or distributed to multiple network elements. Some or all of the modules may be selected according to actual needs to achieve the purpose of this embodiment. For example, each functional module in each embodiment of the application may be integrated into one processing module, or each module may exist physically alone, or two or more modules may be integrated into one module.

The above is only the specific implementation of this application, but the protection scope of this application is not limited to this. Any person familiar with this technical field can easily think of changes or substitutions within the technical scope disclosed in this application, which should be included in the protection scope of this application. Therefore, the protection scope of this application should be based on the protection scope of this claim.

What is claimed is:

1. A training method of a visual language pre-training model, comprising:
    acquiring matching groups respectively corresponding to N images, wherein the matching group of a first image includes: a first matching group composed of the first image and a description text of the first image, and a second matching group composed of a local image of the first image and a description text of the local image, wherein N is an integer greater than 1, and the first image is any one of the N images; and
    training the visual language pre-training model according to the respectively corresponding matching groups of the N images;
    wherein the visual language pre-training model comprises:
    a conversion module, configured to encode the first image to obtain a global representation of the first image, and encode the local image according to the global representation of the first image and the local image to obtain a local representation of the first image;
    wherein the conversion module comprises:
    a convolution layer, configured to perform convolution processing on the first image to obtain a convolution processing result of the first image;

a third converter, configured to encode the convolution processing result of the first image to obtain the global representation of the first image; and a fourth converter, configured to process the global representation of the first image and the local image to obtain the local representation of the first image.

2. The method according to claim 1, wherein the training of the visual language pre-training model according to the matching groups respectively corresponding to the N images comprises:

performing multi-task training on the visual language pre-training model according to the matching groups respectively corresponding to the N images.

3. The method according to claim 2, wherein the multi-task comprises: a visual detection task and a modeling correlation task;

wherein the visual detection task is a task of detecting the local image according to the description text of the local image; the modeling correlation task is to establish correlation between the first image and any description text in the matching groups respectively corresponding to the N images, and correlation between the local image and any description text in the matching group respectively corresponding to the N images.

4. The method according to claim 1, wherein the visual language pre-training model comprises:

a first converter, configured to encode the description text of the first image to obtain a text representation of the first image and encode the description text of the local image to obtain a text representation of the local image; and a second converter, configured to encode the global representation of the first image, the local representation of the first image, the text representation of the first image and the text representation of the local image to obtain a multimodal representation of the first image.

5. The method according to claim 1, wherein the local image includes a local region image and/or an object image of the first image; and the description text of the local image includes: a description text of the local region image and/or the object image.

6. The method according to claim 1, wherein after training the visual language pre-training model according to the matching groups respectively corresponding to the N images, the method further comprises:

fine-tuning the visual language pre-training model.

7. The method according to claim 6, wherein the fine tuning of the visual language pre-training model comprises:

fine-tuning the trained visual language pre-training model through multimodal downstream task corpus; wherein, the multimodal task corpus includes: visual task corpora and linguistic task corpora.

8. An electronic device, including:

a processor and a memory, wherein the memory is configured to store a computer program, and the processor is configured to call and run the computer program stored in the memory to execute a training method of a visual language pre-training model, comprising:

acquiring matching groups respectively corresponding to N images, wherein the matching group of a first image includes: a first matching group composed of the first image and a description text of the first image, and a second matching group composed of a local image of the first image and a description text of the local image, wherein N is an integer greater than 1, and the first image is any one of the N images; and training the visual language pre-training model according to the respectively corresponding matching groups of the N images;

wherein the visual language pre-training model comprises:

a conversion module, configured to encode the first image to obtain a global representation of the first image, and encode the local image according to the global representation of the first image and the local image to obtain a local representation of the first image;

wherein the conversion module comprises:

a convolution layer, configured to perform convolution processing on the first image to obtain a convolution processing result of the first image;

a third converter, configured to encode the convolution processing result of the first image to obtain the global representation of the first image; and a fourth converter, configured to process the global representation of the first image and the local image to obtain the local representation of the first image.

9. The device according to claim 8, wherein the training of the visual language pre-training model according to the matching groups respectively corresponding to the N images comprises:

performing multi-task training on the visual language pre-training model according to the matching groups respectively corresponding to the N images.

10. The device according to claim 9, wherein the multi-task comprises: a visual detection task and a modeling correlation task;

wherein the visual detection task is a task of detecting the local image according to the description text of the local image; the modeling correlation task is to establish correlation between the first image and any description text in the matching groups respectively corresponding to the N images, and correlation between the local image and any description text in the matching group respectively corresponding to the N images.

11. The device according to claim 8, wherein the visual language pre-training model comprises:

a first converter, configured to encode the description text of the first image to obtain a text representation of the first image and encode the description text of the local image to obtain a text representation of the local image; and a second converter, configured to encode the global representation of the first image, the local representation of the first image, the text representation of the first image and the text representation of the local image to obtain a multimodal representation of the first image.

12. The device according to claim 8, wherein the local image includes a local region image and/or an object image of the first image; and the description text of the local image includes: a description text of the local region image and/or the object image.

13. The device according to claim 8, wherein after training the visual language pre-training model according to the matching groups respectively corresponding to the N images, the method further comprises:

fine-tuning the visual language pre-training model.

14. The device according to claim 13, wherein the fine tuning of the visual language pre-training model comprises:

fine-tuning the trained visual language pre-training model through multimodal downstream task corpus; wherein, the multimodal task corpus includes: visual task corpora and linguistic task corpora.

\* \* \* \* \*